(12) United States Patent
Nagarkar et al.

(10) Patent No.: US 7,372,041 B1
(45) Date of Patent: May 13, 2008

(54) NEUTRON DETECTORS AND RELATED METHODS

(75) Inventors: Vivek Nagarkar, Weston, MA (US); Irina Sheshtakova, Merrimack, NH (US); Lena Ovechkina, Allston, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 0 days.

(21) Appl. No.: 11/624,010

(22) Filed: Jan. 17, 2007

(51) Int. Cl.
*G01T 3/06* (2006.01)

(52) U.S. Cl. ................. 250/390.11; 250/214

(58) Field of Classification Search ............ 250/518.1, 250/269.1–269.8, 370.01–370.15, 390.01–390.12; 264/473, 488
See application file for complete search history.

(56) References Cited

U.S. PATENT DOCUMENTS

| | | | | | |
|---|---|---|---|---|---|
| 3,457,180 | A | * | 7/1969 | Hosch et al. ........... | 252/301.17 |
| 4,544,235 | A | * | 10/1985 | Nishida et al. ............. | 385/145 |
| 4,788,436 | A | * | 11/1988 | Koechner ............... | 250/485.1 |
| 5,420,959 | A | * | 5/1995 | Walker et al. ............... | 385/143 |
| 5,521,387 | A | * | 5/1996 | Riedner et al. ............. | 250/367 |
| 5,751,300 | A | * | 5/1998 | Cowger et al. ................. | 347/6 |
| 6,384,400 | B1 | * | 5/2002 | Albagli et al. ........ | 250/214 VT |
| 6,713,765 | B2 | * | 3/2004 | Testardi .................. | 250/363.01 |
| 6,859,607 | B2 | * | 2/2005 | Sugihara ..................... | 385/144 |
| 7,180,068 | B1 | * | 2/2007 | Brecher et al. ......... | 250/361 R |
| 2004/0042585 | A1 | * | 3/2004 | Nagarkar et al. .......... | 378/98.8 |
| 2006/0131503 | A1 | * | 6/2006 | Freund et al. .......... | 250/361 R |
| 2006/0258766 | A1 | * | 11/2006 | Krotkine et al. ............ | 522/150 |
| 2006/0285627 | A1 | * | 12/2006 | Lahoda et al. .............. | 376/419 |

OTHER PUBLICATIONS

"Scintillating optical fiber array for high-resolution x-ray imaging over 5 keV," E. Bigler and F. Polack, Applied Optics, vol. 24, No. 7, Apr. 1, 1985.*
Del Mar Ventures company profile, <http://www.sciner.com/> (retrieved on Nov. 14, 2007).
Mar345 product information, <http://www.mar-usa.com> (retrieved on Dec. 6, 2007).
Bell, "Gadolinium-Loaded Plastic and Rubber Scintillators," <http://www.nnp.ornl.gov/orsens/pubs/ydw> (retrieved on Nov. 7, 2007).
Bollinger and Thomas, "Boron-Loaded Liquid Scintillation Neutron Detectors," *Rev. Sci. Instr.* 28:489-496 (1957).
Brudanin et al., "Element-Loaded Organic Scintillators For Neutron and Neutrino Physics," *Particles and Nuclei, Letters* 6:69-77 (2001).
deVree, "EMCCD-based Photon-counting mini Gamma Camera with a Spatial Resolution < 100 μm," *IEEE Nuclear Science Symposium Conference Record* 5:2724-2728 (2004).
Greenwood and Chellew, "Improved B-loaded liquid scintillator with pulse-shape discrimination," *Rev. Sci. Instrum.* 50:466-471 (1979).

* cited by examiner

Primary Examiner—Kiesha Rose
Assistant Examiner—Kiho Kim
(74) *Attorney, Agent, or Firm*—Townsend and Townsend and Crew LLP

(57) ABSTRACT

The present invention relates generally to neutron detecting scintillators and related methods and devices. A neutron detecting scintillator includes a plurality of microcapillary tubes loaded with a scintillator composition comprising a plastic scintillator and a neutron absorbing material. The present invention additionally provides methods of producing a neutron detecting scintillator having a plurality of microcapillary tubes loaded with a scintillator composition comprising a plastic scintillator and a neutron absorbing material. The method includes preparing a solution comprising a monomer and a neutron absorbing element, introducing the solution into a microcapillary tube of the plurality, and polymerizing the solution within the microcapillary tube.

36 Claims, 6 Drawing Sheets

A

B

C

A

B

C

NEUTRON DETECTORS AND RELATED METHODS

BACKGROUND OF THE INVENTION

The present invention relates generally to neutron detecting scintillators and devices. More specifically, the present invention relates to neutron detecting scintillators, devices and related methods, a scintillator including a plurality of microcapillary tubes loaded with a scintillator composition including a plastic scintillator and a neutron absorbing material.

Scintillation spectrometers and devices are widely used in detection and spectroscopy of energetic photons and/or particles (e.g., x-rays, gamma-rays, neutrons). Such detectors are commonly used, for example, in nuclear and particle physics research, medical imaging, diffraction, non-destructive testing, nuclear non-proliferation monitoring, and the like.

Scintillators and scintillation based detectors are generally well known. Scintillation spectrometry generally comprises a multi-step scheme. Specifically, scintillators work by converting energetic particles such as x-rays, gamma-rays, neutrons, and the like, into a more easily detectable signal (e.g., visible light). Incident energetic photons/particles are stopped by the scintillator material of the device and, as a result, the scintillator produces light photons mostly in the visible light range that can be detected, e.g., by a suitably placed photodetector. Various possible scintillator detector configurations are known. In general, scintillator based detectors typically include a scintillator material optically coupled to a photodetector.

Neutron diffraction provides an excellent tool for the analysis of biological matter. For example, unlike x-rays, neutrons interact with nuclei of atoms in a molecule instead of the electrons. Neutron diffraction techniques, for example, can be more useful than x-ray diffraction in determining positions of protons. One example of a neutron detection based techniques in biology includes single crystal diffraction techniques, which is used for a wide variety of biological analysis including protein analysis, solvation studies, drug design, and the like. Another example of an important neutron detection based application is neutron radiography.

Despite advantages and great promise of neutron detection based techniques, the techniques of neutron crystallography and neutron radiology are relatively underutilized compared to other techniques such as x-ray crystallography. One reason for that is the lack of suitable high performance neutron detectors, such as position sensitive thermal neutron detectors. Most of the area detector technologies rely primarily on imaging plates, multi-wire chambers and photographic methods. All these systems have significant performance limitations in terms of sensitivity, position resolution, count rate capability, logistic complications, or lack of real-time output. The performance of currently available detectors is thus a factor limiting more wide-spread implementation of neutron detectors, and is due at least partially to the current lack of scintillators suitable for high performance neutron detection. For example, currently available scintillators with slow response, and low discrimination between neutron and other events, such as gamma-ray events, typically must sacrifice spatial resolution for detection efficiency, thereby further degrading the performance.

Thus, there is a need for improved neutron detecting scintillators and related devices and assemblies, and methods of fabrication. In particular, there is a need for neutron detecting scintillator and devices that provide improved performance, including enhanced signal-to-noise ratio, improved spatial resolution, and the like, and which can be efficiently and economically manufactured.

BRIEF SUMMARY OF THE INVENTION

The present invention includes neutron detecting scintillators that can be fabricated in large area, and that are suitable for fast, high spatial resolution, high efficiency, neutron scintillation detection with low gamma-ray sensitivity. Scintillator devices of the present invention include a plurality of microcapillary tubes having disposed therein a scintillator composition including a plastic scintillator doped with a neutron absorbing material, such as boron or gadolinium, so as to achieve high sensitivity for thermal/slow neutrons. Scintillation light generated by a neutron interaction with the scintillator composition is substantially confined within the capillary, without laterally spreading through the scintillator array and into neighboring capillaries, thus improving spatial resolution, enhancing image contrast, and minimizing the glared fraction. Thus, the microcapillaries of the scintillator provide a sort of optical fiber, with the scintillator composition forming the fiber core and the microcapillary tube forming a low refractive index cladding around the scintillator material, typically adding both structural support and optical channeling functionality.

The columns formed by the microcapillaries can vary in length and, in some embodiments, can be made long to enhance detection efficiency without sacrificing spatial resolution. For increased neutron detection efficiency, the microcapillary material, such as glass forming a microcapillary tube, may be doped with special additives which have high thermal neutron cross-section. Devices and assemblies can further include an optically coupled photodetector or high resolution readout to realize high performance neutron detection. Another advantage of the present invention is that the scintillators can be fabricated in a large area with relatively low cost.

Additionally, the high-performance, high resolution characteristics of the present neutron detecting scintillator devices are advantageously suitable for use in a wide variety of applications, including dynamic studies. For example, the fast decay of the scintillator allows for high count rates (e.g., up to about 100 MHz) and suitability for dynamic studies. The neutron detecting scintillators have time decay constants in the nanosecond range, which is significantly faster than neutron sensitive scintillators used for imaging having time decay constants in the μs-ms range. For example, in one embodiment it is expected that the disclosed scintillator could reach nanosecond response in the range of 1 to 250 ns while providing very high spatial resolution imaging capability. In one embodiment, for example, scintillators of the invention are configured for high spatial resolution imaging, the imaging comprising a spatial resolution with a value less than about 100 μm (e.g., better than about 100 μm), and typically less than about 50 μm (e.g., about 45 μm). Optionally, scintillator compositions can further include additional elements to effect composition characteristics, such as materials that waveshift the emission spectrum of the scintillator composition, for example, so as to select a quantum efficiency to better match optically coupled photodetectors or readouts.

Thus, in one aspect the present invention includes a neutron detecting scintillator. The neutron detecting scintillator includes a plurality of microcapillary tubes loaded with a scintillator composition comprising a plastic scintillator and a neutron absorbing material. Additionally, the capillary array can be focused toward the radiation source, for example, where the source of neutrons is viewed through a pinhole-collimator, or through a coded aperture mask for applications such as detecting hidden illicit radioactive materials. Thus in one embodiment of the present invention the capillary array of a scintillator, or at least a plurality of capillaries or loaded microcapillary tubes of the scintillator are said to be "focused" or oriented to substantially match a predetermined illumination direction of a radiation beam reaching the pixel.

In another aspect, the present invention provides methods of producing a neutron detecting scintillator having a plurality of microcapillary tubes loaded with a scintillator composition comprising a plastic scintillator and a neutron absorbing material. The method includes preparing a solution comprising a monomer and a neutron absorbing element, introducing the solution into a microcapillary tube of the plurality, and polymerizing the solution within the microcapillary tube.

The present invention can also make use of tubes having dimensions that are larger in size, which can be manipulated and/or drawn down into microcapillary sized tubes, for example, following introduction of a solution or scintillator composition into the tube. Thus, in yet another aspect of the present invention, a method of producing a neutron detecting scintillator having a plurality of microcapillary tubes loaded with a scintillator composition comprising a plastic scintillator and a neutron absorbing material, such a method includes preparing a solution comprising a monomer and a neutron absorbing element. The method additionally includes introducing the solution into a tube and drawing down the tube to form a microcapillary tube. Following drawing down of the tube, the method includes polymerizing the solution within the microcapillary tube.

Methods of the invention can include polymerizing a solution disposed within a tube prior to drawing down the tube to form a microcapillary tube. Thus, in one embodiment the present invention provides methods of producing a neutron detecting scintillator having a plurality of microcapillary tubes loaded with a scintillator composition comprising a plastic scintillator and a neutron absorbing material, the method includes preparing a solution comprising a monomer and a neutron absorbing element, introducing the solution into a tube, polymerizing the solution within the tube, and then drawing down the tube to form a microcapillary tube.

In yet another aspect, the present invention includes a method of producing a neutron detecting scintillator, the method including preparing a solution comprising a monomer and a neutron absorbing element, applying a time-temperature regime to the solution so as to polymerize the solution to form a plurality of fibers, and drawing down the fibers to form a plurality of microfibers. In one embodiment, a capillary tube or cladding (e.g., glass, plastic, etc.) having a refractive index lower than that of the fiber can be added and can act as a light guide.

In another aspect, the invention provides methods of performing radiation detection, including detection of neutron emissions. The method includes providing a neutron detecting scintillator including a plurality of microcapillary tubes loaded with a scintillator composition comprising a plastic scintillator and a neutron absorbing material, and positioning an target within a field of view of the radiation detector as to detect neutron emission from the target. Targets for detection can include any source of detectable signal or emitted neutrons. A target can include, e.g., any potential source of detectable emissions and/or source of diffraction or scattering of the incident neutron beam. The target may include, e.g., a biological specimen, a piece of industrial equipment or component, a patient (e.g., human) or a portion of a patient's body positioned, for example, between a radiation source and the neutron detecting scintillator.

For a fuller understanding of the nature and advantages of the present invention, reference should be made to ensuing detailed description and accompanying drawings. Other aspects, objects and advantages of the invention will be apparent from the drawings and detailed description that follow.

DETAILED DESCRIPTION OF THE INVENTION

Figure 1:
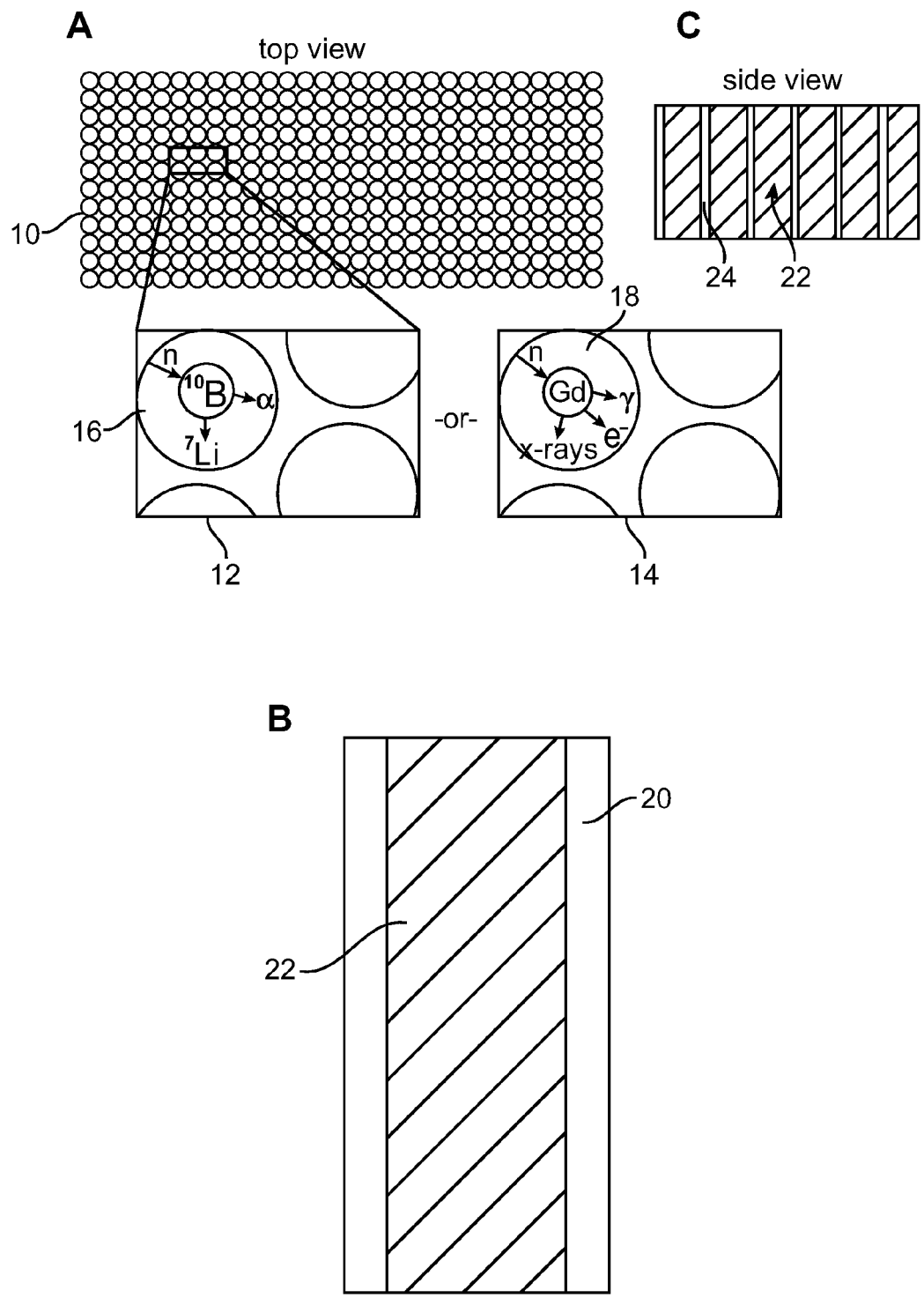
FIGS. 1A through 1C illustrate a neutron detecting scintillator according to an embodiment of the present invention.

Referring to FIGS. 1A through 1C, a neutron detecting scintillator of the present invention is described. FIG. 1A illustrates a top view of a neutron detecting scintillator 10. The scintillator 10 includes a plurality of microcapillary tubes that are loaded with a scintillator composition including a plastic scintillator and a neutron absorbing material. Focused views 12, 14 schematically illustrate interaction of the neutron absorbing material with an incident neutron, and subsequent reaction with the plastic scintillator of the scintillator composition. View 12 illustrates a microcapillary tube 16 loaded with a scintillator composition with neutron absorbing boron. View 14 shows a microcapillary tube 18 loaded with scintillator composition having neutron absorbing gadolinium (Gd). As illustrated, an incident neutron interacts with a neutron absorbing material of the scintillator composition. The energetic photons or particles (e.g., x-rays, gamma rays, alpha particles, etc.) generated as a result of the interaction between the incident neutron and the neutron absorbing material can then be detected in the plastic scintillator by their production of visible light upon interaction with the plastic scintillator.

FIG. 1B shows a cross-sectional side view of a microcapillary tube 20 of the scintillator 10 loaded with a scintillator composition 22. FIG. 1C shows a side view of a plurality of microcapillary tubes of the scintillator 10. The scintillator material 22 is shown loaded in the microcapillary tubes of the scintillator, with the walls 24 (e.g., plastic, glass, etc.) of the microcapillary tubes separating scintillator material 22 of proximate microcapillary tubes. The structured nature of the scintillator material 22 loaded into the microcapillaries of the array limits lateral light spread in the scintillator device, thereby resulting in a high spatial resolution.

Microcapillary tubes of various compositions and dimensions can be used in the present invention and will typically include a plastic or glass material forming walls of the microcapillary tube and defining a lumen into which the scintillator material is disposed or loaded. Microcapillary tubes typically have diameters of about 10 μm or more, and typically up to about 200 μm. Length of microcapillary tubes typically range from about 1 mm to about 3 mm. Certain "thick" scintillators, however, can include microcapillary tubes up to and exceeding 1 cm in length. In one embodiment, selected microcapillary tubes include material (e.g., fiberoptic glass) having low efficiency for high energy gamma rays, which is beneficial for better neutron/gamma discrimination. Microcapillary tubes suitable for use in the present invention can include various commercially available microcapillary tubes, such as those available from Schott's Fiberoptic (Sturbridge, Mass.).

Additional elements or components can be added to the material (e.g., glass, plastic, etc.) forming the microcapillary tube, for example, that may modify the structure and/or functionality of the microcapillary tube. In one embodiment, for example, additional elements can be added to material of the microcapillary tube to enhance the efficiency for neutron detection. For example, a fiberoptic glass microcapillary tube can be loaded with neutron-absorbing elements such as those available for inclusion in the scintillator composition.

Plastic-based scintillators are widely known and numerous suitable plastic scintillators are commercially available. Plastic scintillators including organic molecules which have an aromatic ring and form an organic polymer, such as polystyrene or polyvinyltoluene, are well suited for scintillation based radiation detection. Plastic scintillator material, and scintillator compositions of the invention including plastic scintillator material, typically have a low gamma ray sensitivity. For example, the sensitivity of 5-15 mm thick plastic scintillator to high energy gamma rays is negligible. Such characteristics are advantageous, for example, in that confusion between incident gamma rays and captured neutrons will more likely be avoided.

Plastic scintillators alone and/or in commonly used forms are not very sensitive to low energy neutrons. For example, such plastic scintillators typically do not produce enough light by the proton recoil mechanism used for neutron detection. As such, the plastic scintillators of the scintillation composition of the present invention can be loaded with neutron absorbing materials or dopants with sufficient thermal neutron cross-sections, so the neutrons can be detected by exoergic capture reactions. Non-limiting examples of neutron absorbing materials include Lithium (Li), Boron (B), Samarium (Sm), Cadmium (Cd), Europium (Eu), Gadolinium (Gd) and Dysprosium (Dy).

In one embodiment, a neutron absorbing material can include boron (B). $B^{10}$, e.g., has a high thermal cross-section of 3838 barns (b) and high natural abundance (19.6%). Several possible compositions have been investigated for B-loaded scintillators. In one embodiment, boron carborane (e.g., o-carborane) can be used for boron loading of the plastic scintillator composition. Boron has been demonstrated to have a 22% thermal neutron detection efficiency with 5% mass fraction boron loaded plastic (9 mm thick).

In another embodiment, a neutron absorbing material includes gadolinium (Gd). Gadolinium has two isotopes with high natural abundance: $Gd^{155}$ (14.7%) and $Gd^{157}$ (15.7%) with high thermal neutron cross-sections of $6.1 \times 10^4$b and $2.6 \times 10^5$b, respectively. The Gd content in plastic scintillators typically includes up to about 3% (mass fraction). A Gd-loaded or doped plastic with about 3% mass fraction of Gd displays about 13% neutron detection efficiency for a 1 cm thick piece of plastic. In one embodiment, about 30% solubility of gadolinium nitrate in methylmetacrylate can be achieved. In yet another embodiment, a neutron absorbing material includes Lithium. Lithium has a high slow neutron cross-section (940 barns).

In one embodiment, a scintillator of the present invention can further include one or more coatings, such as those including organic resins and polymers, deposited the scintillator for various reasons. In one embodiment, for example, to act as a protective coating and can help protect the scintillator from damage or degradation, including for example, physical damage, chemical degradation, and the like. In some instances, for example, plastic scintillator composition components such as o-carborane may sublimate at room temperature and can deplete the scintillator of neutron absorbing elements such as boron. As such, coatings can be deposited on one or more surfaces of the scintillator and can partially or completely encapsulate the scintillator. Suitable coatings can include thin transparent layers and/or a coating of suitable organic polymer or resin. An organic polymer resin can include, for example, para-xylylene polymer compositions such as those known by the trade name "Parylene" (e.g., as available from Paratronix, Inc., Attleboro, Mass.). Various other films, mermetic seals, tapes, and the like can be used and will be suitable for use as coatings according to the present invention.

As set forth above and illustrated in FIG. 1, according to the present invention, an incident neutron interacts with a neutron absorbing material of the scintillator composition loaded into a microcapillary tube. The energetic photons or particles (e.g., x-rays, gamma rays, alpha particles, etc.) generated as a result of the interaction between the incident neutron and the neutron absorbing material can then be detected in the plastic scintillator by their production of visible light upon interaction with the plastic scintillator. This process is partially illustrated below, where the interaction of an incident neutron flux with the boron or gadolinium neutron absorbing elements embedded in the body of the scintillator is described:

$$n + {}^{10}B \rightarrow {}^{7}Li(1\ MeV) + {}^{4}He(1.8\ MeV) \rightarrow {}^{7}Li(0.83\ MeV) + {}^{4}He(1.47\ MeV) + \gamma(0.48\ MeV)$$

$$n + {}^{157}Gd \rightarrow {}^{158}Gd + e + \gamma + X\text{-rays}(29\ keV - 182\ keV)$$

$$n + {}^{155}Gd \rightarrow {}^{158}Gd + e + \gamma + X\text{-rays}(29\ keV - 182\ keV)$$

$$n + {}^{6}Li \rightarrow {}^{3}H + \alpha(4.78\ MeV)$$

The x-rays and gamma rays, the alpha particles and the conversion electrons produced by the neutrons in these reactions are then detected in the plastic scintillator, by their interaction with the plastic scintillator and subsequent production of visible light.

Scintillator compositions can further include additional compounds, materials, dopants, and the like. Additionally added compounds can include, for example, compounds that enhance and/or modulate properties (e.g., physical properties, scintillation characteristics, etc.) of the scintillator compositions. In one embodiment, for example, a compound included in a scintillator composition can include an activator (e.g., PPO) and/or a wavelength shifter (e.g., POPOP) that results in wave shifting of the spectrum of the scintillator emissions.

The neutron detecting scintillator of the invention can additionally be optically coupled with one or more photodetectors. Thus, a device of the present invention can additionally include a photodetector optically coupled to a neutron detecting scintillator. Various photodetectors and/or optical readouts can be selected for use in conjunction with the neutron detecting scintillators and can include, for example, numerous charge coupled devices (CCDs), position sensitive or multi-anode photomultipliers (MAPMT), MCP-PMTs, photo-sensitive avalanche photodiode arrays (APDs), a-Si:H flat panels, and the like. In one embodiment, for example, a device of the present invention can include high frame rate and/or internal gain CCD, such as an electron multiplying CCD (EMCCD), coupled with a neutron detecting scintillator. For example, a detector can include a EMCCD that offers high sensitivity, high spatial resolution and low noise operation, even when the device is operated at very high speeds.

A device including a neutron detecting scintillator of the invention can include additional optics or components for receiving and transmitting light from the scintillator to the optically coupled photodetectors. Light receiving and transmitting optics can include, for example, fiber optic elements, lenses, mirrors, and the like. Components of a device or assembly of the present invention, such as a scintillator and a photodetector, can be held in direct contact or can be coupled using an adhesive, resin, optically transparent glue, and the like.

Figure 2:
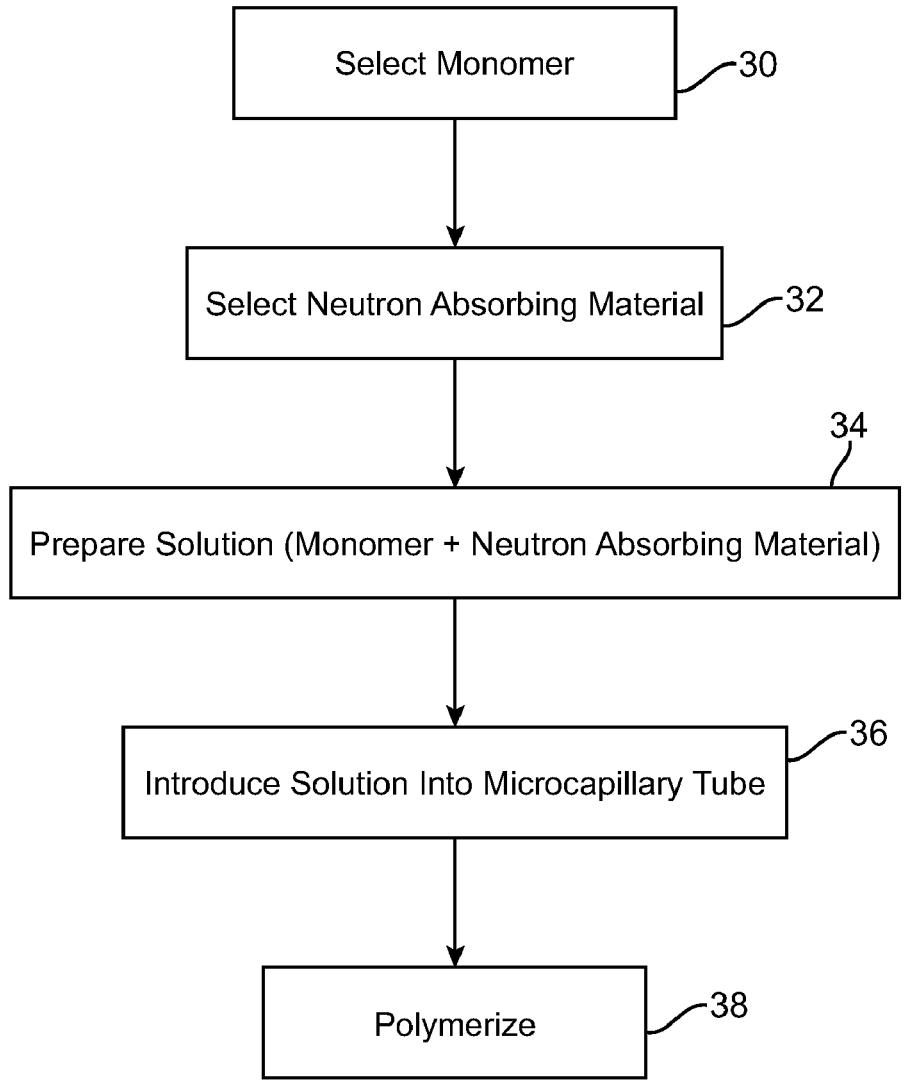
FIG. 2 illustrates production of a neutron detecting scintillator according to an embodiment of the present invention.

Referring to FIG. 2, fabrication of a neutron detecting scintillator is described. The fabrication process according to an embodiment of the present invention includes synthesis of the plastic scintillator from a liquid monomer. Plastic-based scintillators are widely known and are commercially available. However, it is not feasible to inject the plastic into thin capillary arrays. One embodiment of the production process of the current invention is to synthesize the plastic from a liquid monomer injected into the capillary array. A first step involves the selection of a suitable monomer (Step 30). Next, the fabrication process includes selection of a neutron absorbing element (Step 32). Various neutron absorbing elements are suitable for use in the present invention (see above). Following selection of a monomer and neutron absorbing element, a solution is prepared including the selected monomer and neutron absorbing element (Step 34). The liquid solution is introduced into a microcapillary tube (Step 36) and subject to polymerization (Step 38).

Various monomers will be suitable for use in the present invention and may be selected based on a variety of factors including, for example, intended use of the scintillator device, selection of other components (e.g., microcapillary tubes, etc.), and the like. For example, a selected liquid monomer typically will satisfy several conditions. First, the monomer must produce a scintillator material having an index of refraction higher than that of the material of the microcapillary tube into which it is disposed. This helps maximize light localization in the microcapillary tube of the neutron detecting scintillator by internal reflection. In exemplary embodiments, microcapillary tubes included two types of glasses having indices of refraction of 1.49 and 1.56, and selected monomers, therefore, included indices of refraction higher than that of the microcapillary tubes. Second, the minimal volume shrinkage of the liquid monomer after polymerization is desired. Typically, a coefficient of shrinkage of less than about 20% is desired. Additionally, the liquid monomer will have good wettability at the border between the liquid and the glass.

Exemplary embodiments of materials that were determined to be suitable monomers for fabrication of neutron detecting scintillators of the invention included monomers forming the polymer plastics of polystyrene (PS) and polyvinyltoluene (PVT). The index of refraction for polystyrene was n=1.59, and polyvinyltoluene (PVT) was n=1.58. Both monomers were suitable for use with two of the glasses (e.g., n=1.49 and n=1.56) that were used in fabricating a neutron detecting scintillator. The coefficients of shrinkage for these two materials are 14% and 12% accordingly. As discussed above, an optional step is the addition of a compound such as an activator (e.g., PPO) and/or a wavelength shifter (e.g., POPOP) that results in wave shifting of the spectrum of the scintillator emission, e.g., into the 500-550 nm range in order to produce a good quantum efficiency match with a CCD or other Si-based devices. The identified polymers are plastics of ring structure, which allow energy coupling to similarly structured activators, such as PPO.

In one embodiment of the present invention, a plastic scintillator can be produced by combining the following ingredients: styrene, 99% inhibited with 10-15 ppm of 4-tetr-butilcatechol, 2-5-diphenyloxazole, 99% (PPO) and 1-4-bis(5 phenyloxazole-2yl)benzene), 99% (POPOP) used as an activator and waveshifter. A mixture of a styrene (C6H5CH=CH2)+5% PPO+0.2% POPOP can be prepared in a closed container. The necessary chemicals can be obtained from commercial sources such as Alpha Aesar (Ward Hill, Mass.).

As set forth above, fabrication of a neutron detecting scintillator includes selection of a neutron absorbing material. Various neutron absorbing materials are suitable for use in the present invention and are discussed above. In one embodiment, boron-o- or -m-carborane has been identified as a material that allows achieving a high concentration of B in the monomer. Polymerization of the solution inside of a capillary array is done in an inert gas environment to prevent oxidation of the polymer.

Fabrication of a neutron detecting scintillator includes introducing the scintillator composition or solution including monomer and neutron absorbing material into microcapillary tubes. As set forth above, various suitable microcapillary tubes can be used and can include capillary fiberoptic array substrates such as those commercially available (e.g., Schott's Fiberoptic, Sturbridge, Mass.). Custom glasses with neutron absorbers such as Li or B atoms in the fiberoptic glass volume may be used to increase neutron detection efficiency. Microcapillary tubes can be processed and/or cleaned prior to or subsequent to introduction of the scintillator composition. For example, prior to the plastic synthesis the capillary arrays can be thoroughly cleaned to prevent plastic contamination and bubble formation and other irregularities. The microcapillary tubes are filled with the prepared liquid solution and then subjected to a polymerization step.

Any suitable method for introducing the liquid solution into a microcapillary can be used and can include injecting, absorbing, and the like. In one embodiment, the liquid solution can be introduced into the microcapillary using a capillary action. The filling process may be aided by creating a pressure differential across the capillaries. In one example, an inert gas such as Argon is used on the side with the liquid plastic scintillator. This gas can be pressurized with respect to the gas present on the opposite side of the capillaries, or a low grade vacuum can be pulled on that side.

Introduction of the solution into the microcapillary tube, such as by capillary action, can produces a free surface of the polymer in each capillary, with the free surface having a caved-in shape. In one embodiment, an extra layer of polymer can be allowed to form on the top of the capillary array, which can then be removed, for example, by mechanical means such as polishing. Production of a plurality of scintillator material filled microcapillaries in this manner produces an array with the flat plastic surface level with the surface of the ends of the microcapillary tubes.

The prepared solution can be polymerized to form a polymerized scintillator material, for example, once the prepared solution is introduced into the microcapillary tubes. Commonly used liquid monomers, such as monomeric styrene, polymerize upon heating to form a solid plastic polymer (e.g., polystyrene). Thus, polymerization in the present fabrication methods typically includes heating of the prepared solution to form a solid plastic polymer, for example, following introduction of the solution into the microcapillary tubes. In one embodiment, polymerization includes a multi-step thermal polymerization method or process to produce the structured plastic scintillator. The multi-step thermal polymerization includes a process of raising the temperature level in steps (e.g., 110-140-160 degrees C.) over a period of time (e.g., about 60 hours). Typically, the temperature can slowly reach the 160-180 degree C. level.

Figure 3:
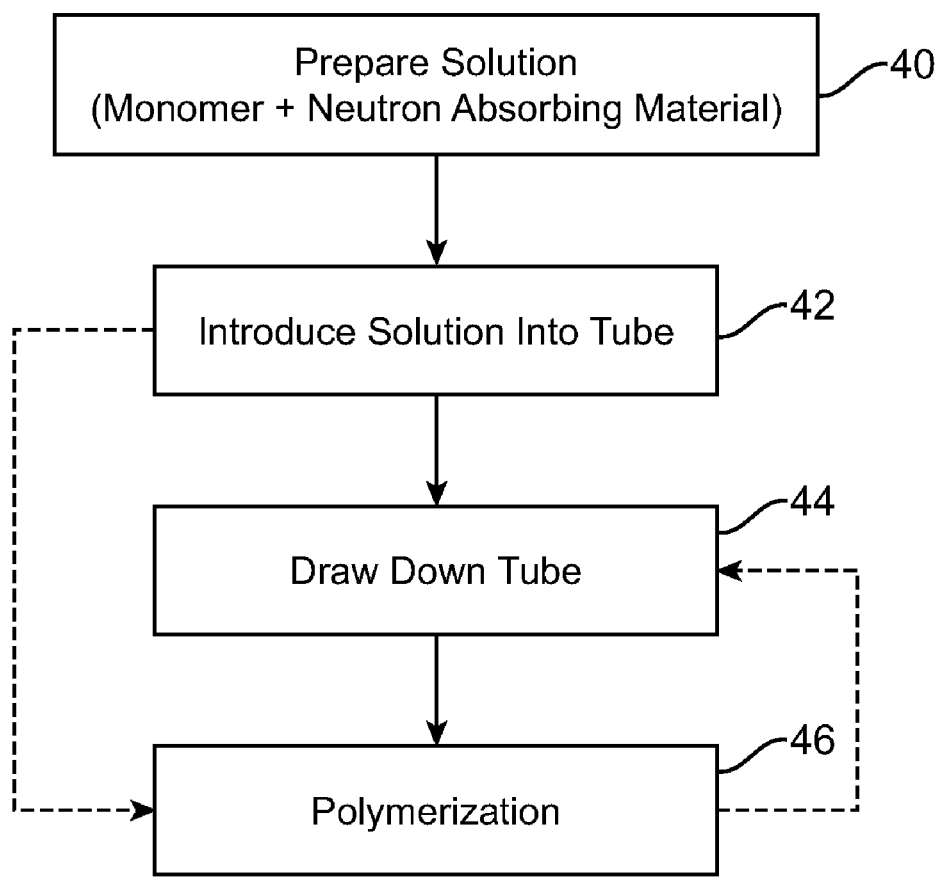
FIG. 3 shows production of a neutron detecting scintillator according to another embodiment of the present invention.

Additional methods of fabricating neutron detecting scintillators are contemplated. Referring to FIG. 3, the present invention can also make use of tubes having dimensions that are larger in size, which can be manipulated and/or drawn down into microcapillary sized tubes, for example, following introduction of a solution or scintillator composition into the tube. The method includes preparing a solution comprising a monomer and a neutron absorbing element, as described above (Step 40). Following preparation of the solution, the solution is introduced into a tube (Step 42), and the tube is drawn down to microcapillary dimensions to form a microcapillary tube (Step 44). Polymerizing the solution within the microcapillary tube (Step 46) can occur once the tube is drawn down into microcapillary dimensions, or can occur prior to drawing down, as indicated by broken lines in FIG. 3.

As set forth above, tubes can be filled with plastic scintillator prior to drawing them down to microcapillary dimensions. Drawing down of tubes and/or fibers of the present invention can be accomplished using methods commonly utilized in the fiber optic arts for drawing down optical fibers and/or optical fiber preforms and can include, for example, application of thermal energy and/or tensile force. For example, a tube can be placed in a drawing device or drawing tower, where the tube or portion thereof (e.g., distal portion, tip, etc.) is heated and the tube or optic fiber is pulled out as a sort of string. By measuring the resultant tube or fiber width, the tension on the tube can be controlled to maintain the microcapillary tube thickness. In one embodiment, a bundle or plurality of tubes having scintillator disposed therein can drawn down to thick fibers. These fibers can then be stacked and drawn down further, with the process repeated until the desired diameter of fiber is achieved in a bundle. Polymerization of solution including at least a monomer and a neutron absorbing element (see above) can occur before or after drawing the capillaries.

In another embodiment, the plastic scintillator composition (e.g., at least plastic scintillator and neutron absorbing material) itself, absent a capillary tube, can be drawn down into micro-fibers or micro-fiber dimensions, for example using methods as described above. Such a method may be desirable, for example, where drawing a microcapillary tube with a scintillator composition may be very difficult due to differences in physical properties between the fiber's plastic core (e.g., scintillator composition) and a microcapillary tube cladding (e.g., glass). This may create voids, bubbles, and other defects which prohibit and/or hinder transmission of scintillation light. Microfibers produced by this method would typically lack the stiffness and/or resiliency found in the microcapillary cladded plastic scintillator compositions, since the microcapillaries (e.g., glass, plastic, etc.) of the arrays provide a robust assembly. Self-supporting fibers may require a substrate to provide the resiliency or robustness found in the microcapillary arrays. Additionally, the microcapillary tubes of the array, including the microcapillary material (e.g., glass), results in a higher efficiency optical channel for the scintillation light compared to self-supported, plastic scintillator composition fibers. In addition, when drawing the plastic fibers, their light-reflecting cladding may crack, fibers may fuse, all undesirable in terms of obtaining uniform images.

In another embodiment of the present invention, fibers drawn from polymerized plastic scintillator composition can be bunched together to form a multi-fiber array. In such an embodiment, fibers formed from the plastic scintillator composition can be drawn down to individual microfibers. A plurality of single microfibers can then be bunched together and subjected to a bonding step so as to bond or fuse together the bunch of single microfibers, thereby forming a multi-fiber cluster or bunch. Such bonding or fusing can include, for example, a time-temperature regime as described above for polymerization of plastic scintillator composition. Additionally, several multi-fiber bunches or clusters can additionally be bunched together and a bonding/fusing process repeated so as to form an array of multi-fiber bunches or clusters, or a sort of "multi-multi-fiber array", that have been bonded or fused together. The bonding or fusing will typically be sufficient to hold the individual microfibers and/or multi-fiber bunches together while preserving the structural integrity and light channeling characteristics of the individual fibers. In some embodiments, the multi-fiber bunch, or array of multi-fiber bunches or "multi-multi-fiber array" may have sufficient cross-sectional area to slice and/or polish it, and use as a scintillator plate. The arrays may also be further processed to form tapers, and/or inverters, similar to as routinely done with conventional fiberoptics.

Several samples of a structured neutron scintillator have been produced. In one embodiment, a sample included a microcapillary array, the array having dimensions of about 35 mm×56 mm, 1 mm thick with microcapillary tubes having 200 μm pores. The microcapillary tubes were evenly distributed over the area of the sample (see FIG. 4A).

The plastic scintillator was produced by combining the following ingredients: styrene, 99% inhibited with 10-15 ppm of 4-tetr-butilcatechol, 2,5-diphenyloxazole, 99% (PPO) and 1,4-bis (5 phenyloxazole-2yl) benzene), 99% (POPOP) used as an activator and waveshifter.

A liquid solution mixture of a styrene +5% PPO+0.2% POPOP was prepared in a closed container. A plurality of fiberoptic microcapillary tubes was placed on the surface of the prepared liquid solution, which was drawn into the microcapillary tubes and then slowly polymerized by a multi-step thermal process (110-140-160 degrees C.) over 60 hours. This process resulted in uniformly filled fiberoptic channels in the microcapillary tubes. A plastic scintillator film formed on the top surface of the fiberoptic or microcapillary tubes confirmed that the complete saturation of the microcapillaries by the plastic scintillator composition had been achieved. FIG. 4B displays the microscope view of three capillaries filled with plastic scintillator. The microscopic inspection confirmed the uniform fill of the capillaries without cracks or bubbles in the body of the scintillator. The imaging resolution of this structured scintillator sample was evaluated with an electron emitting source ($Sr^{90}$). The scintillator was coupled to a photodetector (e.g., cooled CCD with 57 micron square pixels). The source was placed directly on top of the scintillator and an image was acquired. The resulting image showed a good distinction between separate plastic columns, illustrating that the plurality of microcapillary tube fibers where substantially optically independent and formed a structured scintillator or organized array of fiber optic, microcapillary scintillator fibers (e.g., microcapillary tubes loaded with plastic scintillator composition) (see, e.g., FIG. 5).

Figure 4:
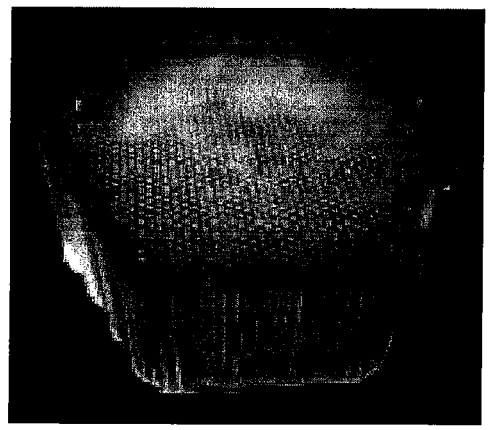
FIGS. 4A through 4C show a photograph of a neutron detecting scintillator including an array of microcapillary tubes loaded with a plastic scintillator composition (FIG. 4A); a microscope photograph of three 200 μm microcapillaries loaded with the plastic scintillator composition (FIG. 4B); and an SEM micrograph of a glass capillary array filled with a neutron sensitive plastic scintillator composition according to an embodiment of the present invention (FIG. 4C).
Figure 4:
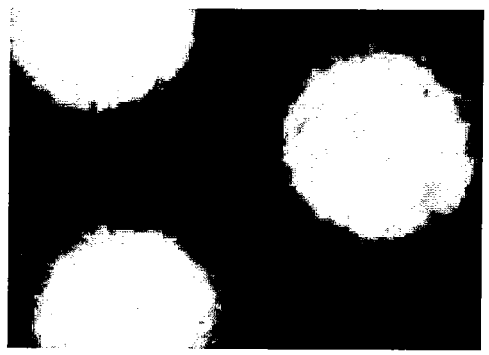
Figure 4:
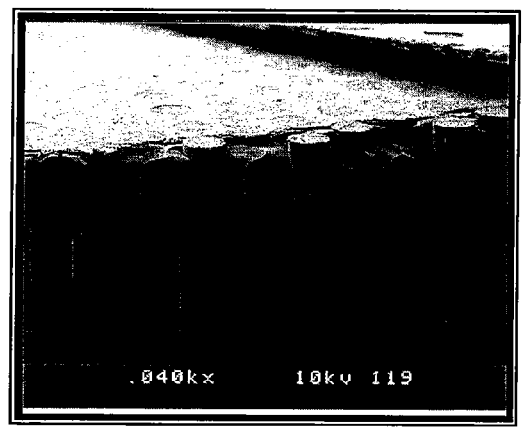
Figure 5:
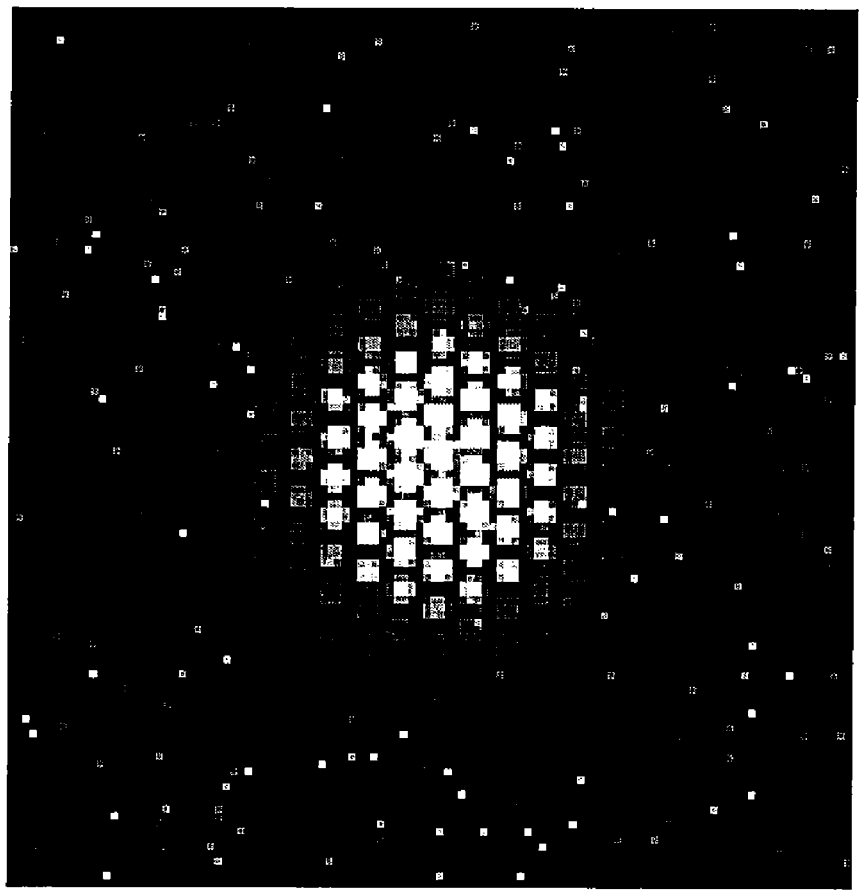
FIG. 5 illustrates an image of a collimated beta source placed on top of a structured scintillator including an array of microcapillary tubes loaded with a plastic scintillator composition.

The emission spectrum of the structured scintillator illustrated in FIGS. 4-5 was measured with an 8 keV x-ray source. The wavelength peak of the sample's emission was about 425 nm. The light output with x-ray excitation of the sample was compared to that of a similar size LSO sample, which has light output of ~35000 photons/MeV. The light output of the plastic sample was about 25% of the LSO's light output, since plastic is less sensitive to x-rays compared to LSO. However, the plastic scintillator generally has a light output of 50-75% of that of anthracene (a common reference material) with higher energy gamma-rays, demonstrating that the plastic scintillator disposed in the microcapillary tubes provided a suitable scintillator for neutron detection according to the present invention.

Thickness of a neutron detecting scintillator of the invention can vary, and may be selected, for example, based on intended use of the scintillator. As will be recognized, thickness of the a scintillator corresponds to the length of the microcapillary tubes forming the scintillator. Since higher sample thickness may be desirable for higher neutron detection efficiency in some circumstances, fabrication and use of structured scintillators with a thicker fiberoptic substrate (e.g., greater than about 1 cm thick). In one example, a structured plastic scintillator was prepared using a 1.4 cm thick porous fiberoptic plate, or bundle of fiberoptic microcapillary tubes loaded with scintillator composition, with the pore diameters of 200 μm, shown in FIG. 4A. In one embodiment, a scintillator having 100 μm diameter capillaries was produced, though detail of the tubes was not resolved by the optics of the camera used to photograph it (data not shown). Fabrication of a "thick" scintillator having these dimensions (e.g., greater than about 1 cm thick) demonstrated good capillary saturation and uniform internal structure.

Figure 6:
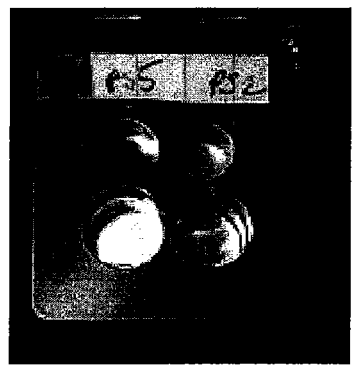
FIGS. 6A through 6C illustrate neutron detecting scintillator samples and neutron detection test results, including a photograph of four samples in a plastic holder coupled to a position sensitive photomultiplier tube (PSPMT) (FIG. 6A); a side view of the detector including samples coupled to the PSPMT (FIG. 6B); and a neutron detection image of the samples (FIG. 6C).
Figure 6:
Figure 6:
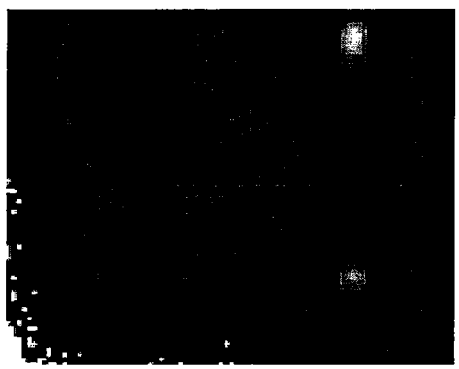

In another embodiment, a scintillator composition including a plastic scintillator and neutron absorbing material was examined and tested for detection of thermal neutrons. In one example, the neutron detecting scintillator included a boron-loaded plastic scintillator material. The scintillator composition samples were produced as separate pieces in cylindrical form (see, e.g., FIGS. 6A and 6B). As discussed above, o-carborane may be utilized in boron loading of a plastic scintillator, since it has 75% mass fraction of boron. Thus, in one embodiment, a neutron detection scintillator composition including plastic scintillator loaded with neutron absorbing boron was produced using o-carborane. For example, samples of polystyrene-based plastic scintillator, containing 1% and 3.7% mass fraction of o-carborane were prepared and thermal polymerization was used to produce neutron detecting scintillator composition samples. In some embodiments, 2,5-diphenyloxazol (PPO) and 1,4-bis (5 phenyloxazole-zyl) benzene (POPOP) have been used as an activator and waveshifter. Larger dimensioned scintillator composition samples included polished cylinders of 9 mm diameter and 20 mm tall. As illustrated in FIGS. 4A through 4B, four such samples were inserted in a plastic holder and coupled to a position-sensitive photomultiplier (PSPMT) (Hamamatsu R8520U-00-C12). The illustrated PSPMT features 6×6 cross-plate anodes includes a 22 mm×22 mm area. Photocathode sensitivity ranges from 300 to 650 nm. The position of the signal can be read via a resistive chain scheme. In one example, the resulting detector was exposed to a flux of thermal neutrons to acquire a 10 s image, with the resulting neutron image shown in FIG. 6C. The results demonstrate that such scintillator compositions are suitable for use in neutron detection according to the present invention. The data further demonstrates position sensitive neutron detection, though the low spatial resolution can be improved.

It is understood that the examples and embodiments described herein are for illustrative purposes only and that various modifications or changes in light thereof will be suggested to persons skilled in the art and are included within the spirit and purview of this application and scope of the appended claims. Numerous different combinations are possible, and such combinations are considered to be part of the present invention.

What is claimed is:

1. A neutron detecting scintillator, comprising a plurality of glass microcapillary tubes loaded with a solid scintillator composition comprising a plastic scintillator and a neutron absorbing material.

2. The neutron detecting scintillator of claim 1, wherein the neutron absorbing material comprises Li, B, Gd, Sm, Cd, Eu or Dy.

3. The neutron detecting scintillator of claim 1, wherein the glass of the microcapillary tubes comprises a neutron absorbing material disposed therein.

4. The neutron detecting scintillator of claim 3, wherein the neutron absorbing material disposed in the glass of the microcapillary tubes comprises Li, B, Gd, Sm, Cd, Eu or Dy.

5. The neutron detecting scintillator of claim 1, further comprising a photodetector optically coupled to the scintillator.

6. The neutron detecting scintillator of claim 5, further comprising a fast lens disposed between the photodetector and the scintillator.

7. The neutron detecting scintillator of claim 5, further comprising a fiberoptic taper disposed between the photodetector and the scintillator.

8. The neutron detecting scintillator of claim 5, further comprising a optically transparent adhesive disposed between the photodetector and the scintillator.

9. The neutron detecting scintillator of claim 5, wherein the photodetector comprises a position sensitive photomultiplier tube (PMT), a position sensitive avalanche photodiode (APD), an a-Si:H flat panel, a charge coupled device (CCD), or electron-multiplying CCD (EMCCD).

10. The neutron detecting scintillator of claim 1, the scintillator composition further comprising an activator.

11. The neutron detecting scintillator of claim 10, wherein the activator comprises 2,5-diphenyloxazol (PPO).

12. The neutron detecting scintillator of claim 1, the scintillator composition further comprising a wavelength shifting element for shifting the scintillator emission spectrum.

13. The neutron detecting scintillator of claim 12, wherein the wavelength shifting element comprises 1,4-bis-(5-Phenyl-2-oxazolyl)benzene.

14. The neutron detecting scintillator of claim 1, the microcapillary tubes having diameters of about 10 μm to about 200 μm.

15. The neutron detecting scintillator of claim 1, the microcapillary tubes having lengths of about 1 mm to about 30 mm.

16. The neutron detecting scintillator of claim 1, wherein a plurality of the loaded microcapillary tubes of the scintillator are oriented to form pixels with each pixel of a plurality substantially matching a different predetermined illumination direction of a radiation beam reaching the pixel.

17. A method of producing a neutron detecting scintillator having a plurality of glass microcapillary tubes loaded with a solid scintillator composition comprising a plastic scintillator and a neutron absorbing material, the method comprising:
  preparing a solution comprising a monomer and a neutron absorbing element;
  introducing the solution into a microcapillary tube of the plurality; and
  polymerizing the solution within the microcapillary tube.

18. The method of claim 17, wherein the monomer is styrene.

19. The method of claim 17, wherein the neutron absorbing material comprises Li, B, Gd, Sm, Cd, Eu or Dy.

20. The method of claim 17, wherein the polymerization comprises applying a time-temperature regime.

21. The method of claim 17, further comprising adding an activator to the solution.

22. The method of claim 21, wherein the activator comprises 2,5-diphenyloxazol (PPO).

23. The method of claim 17, further comprising adding a wavelength shifting element.

24. The method of claim 23, wherein the wavelength shifting element comprises 1,4-bis-(5-Phenyl-2-oxazolyl)benzene.

25. The method of claim 17, wherein the polymerization occurs in an inert gas atmosphere.

26. The method of claim 17, wherein the introducing the solution into a microcapillary tube comprises applying a pressure differential to opposed ends of the microcapillary tube.

27. The method of claim 17, further comprising depositing a resin layer on at least one surface of the neutron detecting scintillator.

28. The method of claim 27, further comprising polishing a surface of the scintillator to provide a substantially flat surface.

29. A method of producing a neutron detecting scintillator having a plurality of microcapillary tubes loaded with a solid scintillator composition comprising a plastic scintillator and a neutron absorbing material, the method comprising:
  preparing a solution comprising a monomer and a neutron absorbing element;
  introducing the solution into a tube;
  drawing down the tube with solution to reduce a cross sectional area of at least a portion of the tube and form a microcapillary tube having solution disposed therein; and
  polymerizing the solution within the microcapillary tube.

30. The method of claim 29, wherein the monomer is styrene.

31. The method of claim 29, wherein the polymerization comprises applying a time-temperature regime.

32. A method of producing a neutron detecting scintillator having a plurality of microcapillary tubes loaded with a scintillator composition comprising a plastic scintillator and a neutron absorbing material, the method comprising:
  preparing a solution comprising a monomer and a neutron absorbing element;
  introducing the solution into a tube;
  polymerizing the solution within the tube;
  drawing down the tube having polymerized solution to reduce a cross sectional area of at least a portion of the tube and form a microcapillary tube comprising a solid scintillator composition comprising plastic scintillator and neutron absorbing material.

33. The method of claim 32, wherein the monomer is styrene.

34. The method of claim 32, wherein the polymerization comprises applying a time-temperature regime.

35. A method of producing a neutron detecting scintillator, the method comprising:
  preparing a solution comprising a monomer and a neutron absorbing element;
  introducing the solution into a tube to form a fiber comprising solution disposed in a lumen of the tube;
  assembling a plurality of fibers in a bunch;
  drawing down the plurality of fibers to reduce a cross-sectional area of at least a portion of the tube and form a plurality of microfibers;
  applying a time-temperature regime to the solution so as to polymerize the solution.

36. The method of claim 35, wherein the monomer is styrene.

* * * * *